United States Patent [19]
Zulian et al.

[11] Patent Number: 5,701,413
[45] Date of Patent: Dec. 23, 1997

[54] MULTI-PROCESSOR SYSTEM WITH SHARED MEMORY

[75] Inventors: Ferruccio Zulian, Cornaredo; Angelo Ramolini, Cislago; Carlo Bagnoli, Milan; Angelo Lazzari, Vigevano, all of Italy

[73] Assignee: Bull HN Information Systems Italia S.p.A., Italy

[21] Appl. No.: 179,440

[22] Filed: Jan. 10, 1994

[30] Foreign Application Priority Data

Jan. 25, 1993 [EP] European Pat. Off. ............. 93830022

[51] Int. Cl.$^6$ .............................. G06F 13/00; G06F 15/16
[52] U.S. Cl. ........................... 395/200.02; 364/228.1; 364/229; 364/231.8; 364/231.9; 364/232.7; 364/DIG. 1
[58] Field of Search ....................... 395/200, 325, 395/800

[56] References Cited

U.S. PATENT DOCUMENTS

| | | | |
|---|---|---|---|
| 4,503,496 | 3/1985 | Holzner et al. | 395/200.07 |
| 5,067,071 | 11/1991 | Schanin et al. | 395/275 |
| 5,247,689 | 9/1993 | Ewert | 395/800 |
| 5,274,768 | 12/1993 | Traw et al. | 395/275 |
| 5,276,895 | 1/1994 | Grondolski et al. | 395/800 |
| 5,297,255 | 3/1994 | Hamanaka et al. | 395/200 |
| 5,438,680 | 8/1995 | Sullivan et al. | 395/650 |
| 5,440,752 | 8/1995 | Lentz et al. | 395/800 |

FOREIGN PATENT DOCUMENTS

| | | |
|---|---|---|
| 0238754A2 | 12/1986 | European Pat. Off. . |
| 0238754A3 | 12/1986 | European Pat. Off. . |
| 0315550A2 | 11/1988 | European Pat. Off. . |
| 0315550A3 | 11/1988 | European Pat. Off. . |
| 0451938A2 | 2/1991 | European Pat. Off. . |
| 0451983A3 | 2/1991 | European Pat. Off. . |
| WO89/09967 | 4/1989 | WIPO . |

OTHER PUBLICATIONS

Marquardt, D., Alkhatib, H., *A Cache–Coherent, Distributed Memory Multiprocessor System and Its Performance Analysis*, IEICE Taransactions on Information and Systems, vol. E75–D No. 3, May 1992, pp. 274–290.

Bagnoli, C, Gori, M & Soda, G, *Design and Implementation of the GMMP Multi–Processor System*, MIMI '84, Proc. ISMM Int. Symp., Mini–and Microcomputers & their Application, Bari (Italy), 5, Jun., 1984, pp. 95–98.

Primary Examiner—Kevin J. Teska
Assistant Examiner—Ayni Mohamed
Attorney, Agent, or Firm—Edward D. Manzo; Mark J. Murphy; Ted K. Ringsred

[57] ABSTRACT

A multi-processor system in wherein a plurality of processors have access to a plurality of shared memory modules, comprising a memory control unit, interconnection logic circuits, a system bus for the multipoint connection of the processors to the memory control unit and for the transfer of memory addresses and commands for ordered and successive read/write operations via the system bus and the memory control unit, whilst the transfer of data to and from the memory modules takes place through data channels which connect the various processors on a point-to-point basis to the interconnection logic circuits and via these to a memory data transfer channel.

11 Claims, 7 Drawing Sheets

MULTI-PROCESSOR SYSTEM WITH SHARED MEMORY

The present invention relates to a multi-processor system with shared memory.

It is known that to obtain high performance in data processor systems use is made of multi-processor architectures in which a plurality of processors simultaneously perform a plurality of processes by dividing the tasks.

Cooperation between processors requires that the processors exchange information and messages and that they are able to operate on the same data.

The processors must therefore be connected together and to at least one working memory by means of suitable communication channels.

It is also known that the technology offers working memories having large capacity and low cost, but which have read/write times very much greater than the operating times of the processors.

In order fully to exploit the power offered by the processors use is therefore made of fast local memories or caches of limited capacity, each associated with a processor, and a plurality of individually and independently addressable working memories.

The addressable memory space is thus distributed between several units or banks of memory with "interleaving" criteria which minimise the probability of conflict in accessing the plurality of memories by several processors.

The adoption of fast local memories in which data stored in the working memory can be replicated, for more rapid access, gives rise to problems of coherence or, using Anglo Saxon terminology, problems of data "consistency".

The adoption of several memory modules gives rise to interconnection problems between the various processors and the various modules.

The state of the art offers two architectural approaches which at least partially resolve these problems.

1) "bus" architecture or multipoint communication channels.

All the processors and all the memories of the system are connected to a single system bus, which constitutes a time-shared resource to which the processors and possibly the memories have access in competition with one another for limited and non-overlapping time intervals.

Access to the system bus is assigned, on request of the various units, by arbitration logic of unitary or distributed type, which resolves the access conflicts according to pre-established criteria.

This type of architecture offers essentially two advantages:

the operations for interconnecting two units (processor and memory) via the system bus are all serialised and ordered with respect to one another and allow an easy management of the communication process;

all the processors connected to the system bus can see all the transactions taking place on the system bus; it is therefore possible to assure in real time the consistency of the data with relatively simple "snooping" or observation mechanisms.

On the other hand, the disadvantages or limitations of the architecture are considerable:

each wire of the system bus is connected to a large number of input and output loads; driver circuits having a power suitable to the load and which are therefore relatively slow, are therefore necessary for signals on the various wires.

The essentially capacitive nature of the loads limits the signal frequency which can be transferred and therefore the speed of transfer of the information or "transfer rate" of the system bus.

Sharing the same resource for read/write operations between several units increases the access conflicts and consequently the problems of response, that is to say, waiting for access to the bus and for possible subsequent reception of the requested information. The response time is not determined only by the slowness of a memory unit in responding, but also to possible bus access conflicts, the probability of which is higher the higher the number of units competing for bus access, and the longer the time required to transfer significant information along the bus and to carry it away, thereby freeing the bus.

2) The "crossbar switch" architecture or connection cross bar architecture.

The processors and the memory are interconnected in pairs by means of a plurality of communication channels which intersect and are selectively interconnected by the selective closure of switches.

The advantages of this type of architecture are:

more pairs of units are able to intercommunicate simultaneously on separate channels the matrix interconnection makes it possible to reduce the RC loads of the various communication lines.

It is therefore possible to use control circuits of lower power, and to operate at a higher frequency.

The transfer rate which can be achieved is very high not only because it allows a greater frequency of the transferred signals but also due to the many simultaneous parallel transfers. Moreover, the paired interconnection of units, generally maintained for several successive transactions, allows channelling or "pipelining" of the transactions and a further increase of the transfer rate which can be achieved without creating response time problems for the other processes for the majority of the time the resource is occupied.

On the other hand, even in this case there are significant disadvantages:

the simultaneous transfer on many pairs of interconnections impedes "snooping" between processors, and the coherence of the data may deteriorate in an environment in which it is replicated in several memories or stores.

To ensure coherence it is necessary to renounce simultaneous transfers (at least of addresses).

the problems of "routing" of the signals and of termination of the components and management of the interconnections, becomes particularly onerous.

This disadvantage is obviated by the multi-processor system forming the subject of the present invention, in which a plurality of processors each communicate with a shared memory, constituted by a plurality of separately addressable modules by means of a system bus (or multipoint connection) for transfer of addresses and commands and by means of point-to-point data channels which connect each processor individually to a data cross bar interconnection logic and via this to memory modules.

There is thus realised a hybrid architecture which associates the advantages of the bus system architecture and the cross bar architecture and which:

Allows ordered pipelining of several transfers between the same processor and the memory.

Reduces the loads of the point-to-point data transfer channels between individual processors and memory, making it possible to operate at high transfer frequencies.

Allows parallel transfers to take place which involve different resources.

Allows ordered serialisation of access to the memory.

Allows all the processes to perform "snooping" of the address channels and the data consistency in real time in the case of architectures with data replicated in local memories or caches.

According to a further aspect of the present invention the memory modules are separately controlled to read or write in such a way as to operate with partial overlap of operating time and, therefore, as autonomous memory units, but are addressed via a common control unit connected to the system bus or address bus.

The memory control unit also fulfils the role of arbitration unit for access to the system bus.

In this way the load of the address bus is reduced to single processors and to the memory control unit.

According to another aspect of the present invention the data cross bar logic is provided with input/output registers both to the shared memory and to the processors.

With this transfer structure in cascade from register to register, several transfers can be made in parallel and "pipelining" from and to memory is possible with partial overlap of transfer time even if the data crossbar functions as collector for all the data exchanges with the memory through a single data channel. This channel constitutes a node which does not limit the rate of transfer of data because the time necessary for transfer of data through the node can be contained within limits to be very short.

According to a further aspect of the present invention the interconnection logic is provided, as well as with buffer registers (or buffers), with channels having a different parallelism for connection to memory and to different processors, that between memory and data crossbar being of N×M bytes, whilst that between data crossbar and processors being only of N bytes.

Whilst the transfer of information between memory and data crossbar takes place simultaneously for blocks of N×M bytes the transfer between data crossbar and processors takes place by serialising the operation in M successive phases during the course of each of which a block of N bytes is transferred.

The serialisation does not create response problems because the connections between data crossbar and processors are dedicated and there is no mutual interference.

The higher parallelism of the memory with respect to that of the processors on the other hand makes it possible to adapt the memory capacity or throughput to the possible processor requests which operate at a higher speed, and at the same time to contain within acceptable limits the number of terminations of the various electronic components or units and the passive electronic connections between the various units.

The limitation on the number of terminations can be imposed not only for reasons of economic convenience or of technical practicability of electronic components with a large number of input/output terminals, but also by the requirements of convenience of use of commercially available components with interfaces directed to the use of standard communication buses.

At the interface level, in fact, the hybrid interconnection architecture on which the multi-processor system the subject of the present invention is based, is seen as a conventional standard bus, for example of the "VME or FUTURE BUS" type.

The characteristics and advantages of the invention will become clearer from the following description of a preferred embodiment of the invention and from the attached drawings, in which:

FIG. 1 shows in block schematic form a multi-processor system which shared memory and architecture structured in accordance with the present invention.

Figure 1:
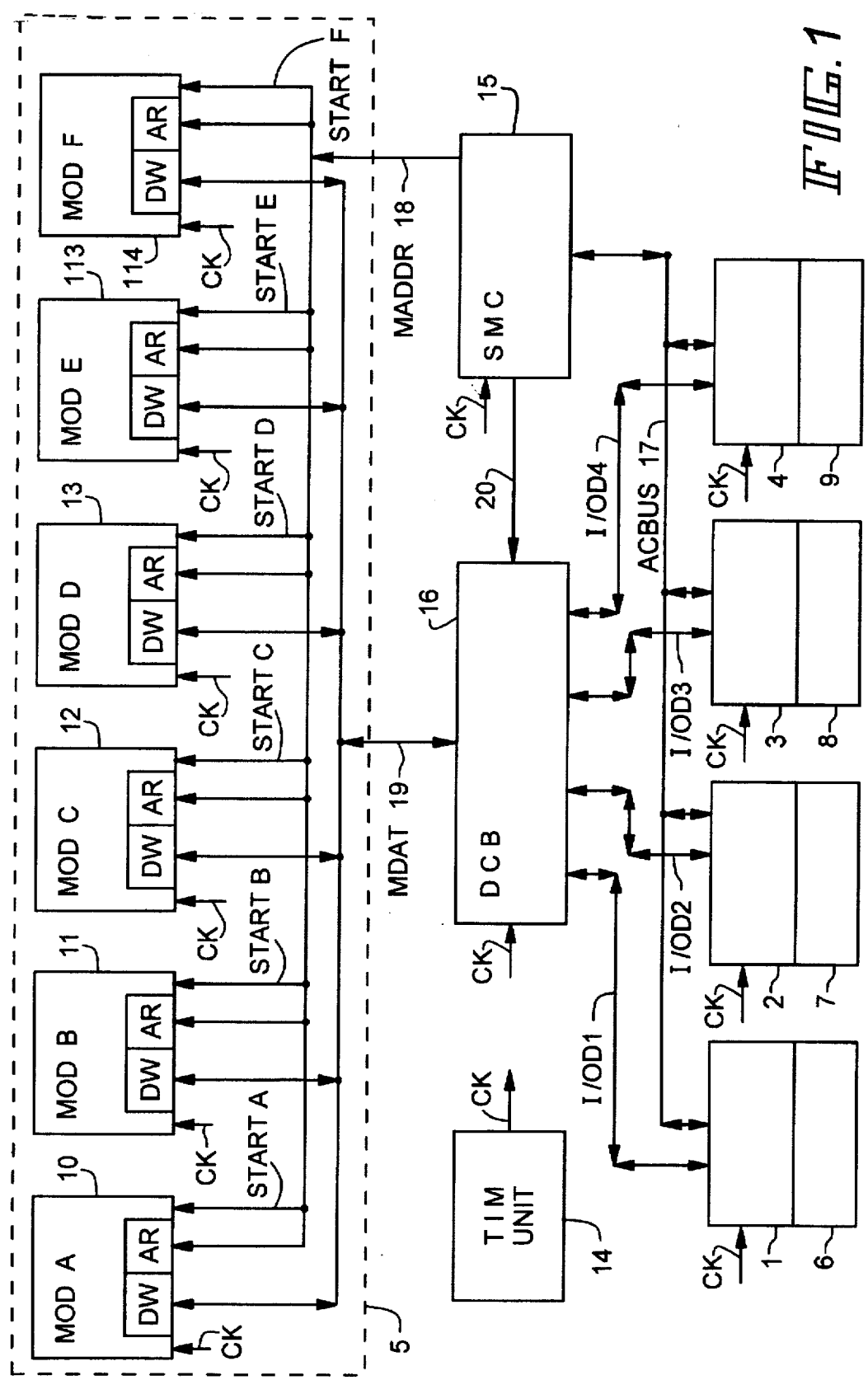
FIG. 1 is a block schematic representation of a multi-processor system with shared memory having architecture structured in accordance with the present invention.

The system comprises a plurality of processors 1, 2, 3, 4, each provided with a buffer memory or cache 6, 7, 8, 9, a system memory 5 constituted by a plurality of modules 10, 11, 12, 13, 113, 114 (preferably greater in number than the number of processors), a timer unit TIM UNIT which generates a timing signal CK of a predetermined frequency, a system memory control unit 15 (SMC) for controlling the system memory and arbitration of the system bus, and a data channel control logic 16 or data cross bar (DCB).

The processors 1, 2, 3, 4 are connected together and to the system memory control unit (SMC) 15 by means of a bus (ACBUS) 17 for transferring address and commands.

Via suitable wires of this bus, and with a conventional arbitration and communication protocol, the processors send to the SMC unit (15) requests ABREQ for access to the bus and receive individually a bus grant signal AB GRANT, following which it can effectively occupy the bus 17 and transfer to the SMC unit 15 a memory address and the signals which identify the requested operation such as reading, writing or another type (RWIM).

The system bus AC BUS 17 constitutes a multi-point communication channel except possibly, but not necessarily, for the transfer of bus access requests ABREQ, the corresponding bus grant response BGRANT and the various processor state signals which are preferably exchanged between each of the processors and the unit 15 on point-to-point connections.

The unit 15 transfers to the memory 5, via a channel MADDR 18, the read/write address accompanied by suitable timing commands (STARTA, STARTB, STARTC, STARTD, STARTE, STARTF), which, in dependence on the address, select and activate one of the various memory modules 10, 11, 12, 13, 113, 114.

In each module a register AR holds the read/write address for the whole of the time necessary, even if the time for which the address lasts on the channel MADDR 18 is limited.

The transfer of data, on the other hand, takes place via the point-to-point connections selectively formed by the unit DCB 16 on the basis of timing commands received from the unit 15, between each of the processors 1, 2, 3, 4 and a memory data input/output channel MDAT, 19 or between pairs of processors.

In each memory module a register DW holds one unit of data to write, received from the channel MDAT 19 for the whole of the time necessary for the write operation.

In FIG. 1 the processors 1, 2, 3, 4 are connected to the unit DCB 16 via the data channels I/OD1, I/OD2, I/OD3, I/OD4 respectively.

The operation of the whole system is synchronous and the various units are all clocked by the periodic signal CK generated by the unit 14.

Figure 2:
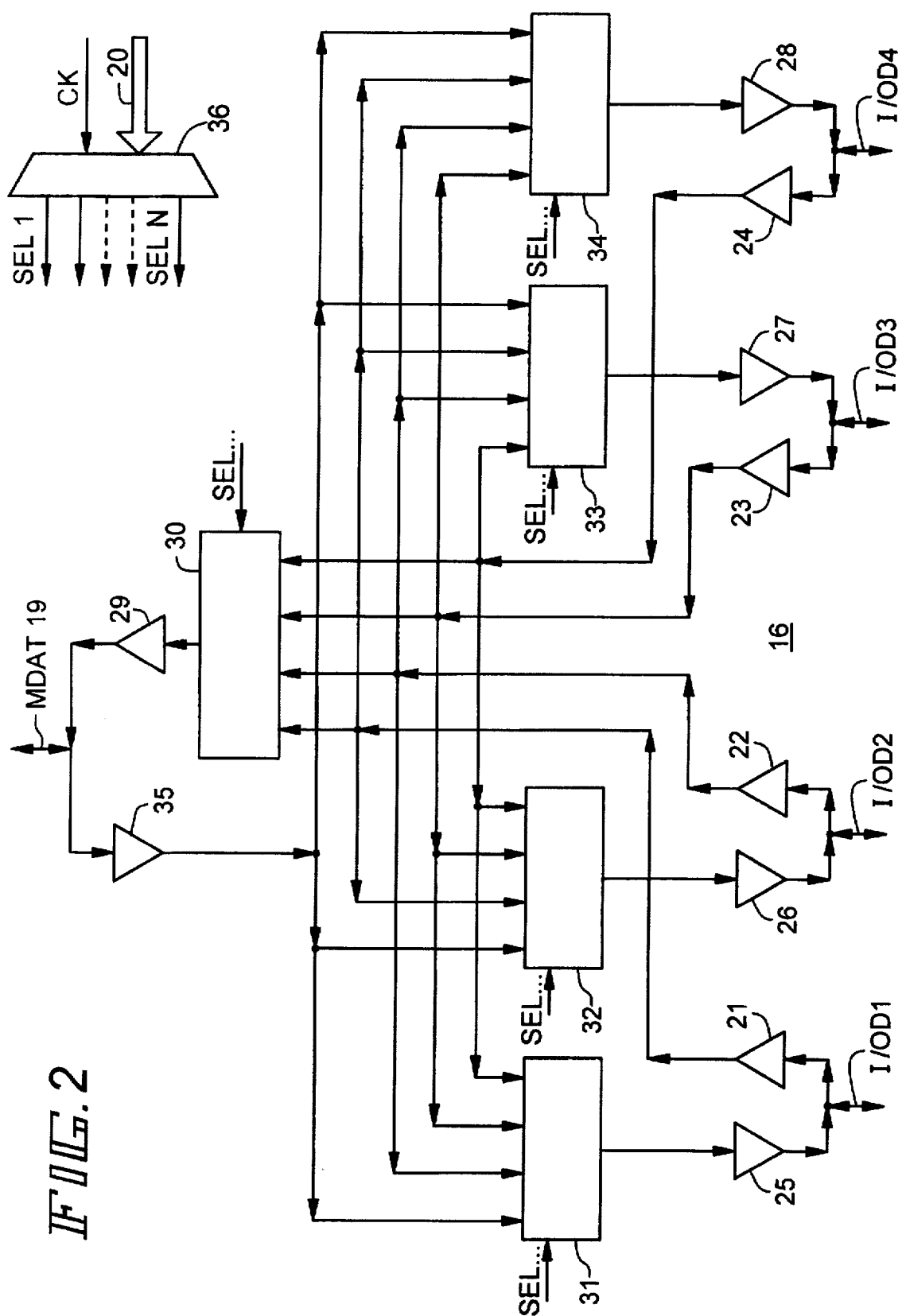
FIG. 2 is a block schematic diagram of an embodiment of a data cross bar for the architecture of FIG. 1.

FIG. 2 shows in block schematic form the architecture of the unit DCB 16, made in the form of an integrated circuit.

If the parallelism of the data channel is so high as not to allow it to be made as a single integrated circuit, the unit DCB 16 can be made as a plurality of identical integrated circuits according to the known concept of "bit slicing" or division of the logic by groups of bits.

The unit DCB 16 essentially comprises four groups of receivers 21, 22, 23, 24 for the input of data for the channels I/OD1, I/OD2, I/OD3, I/OD4, four groups of control circuits or drivers 25, 26, 27, 28 for the introduction of data onto channels I/OD1, I/OD2, I/OD3, I/OD4, a group of drivers 29 for the introduction of data onto the channel 19, a group of receivers 35 for input into DCB of data coming from the channel 19, and five multiplexers 30, 31, 32, 33, 34.

The inputs of the multiplexer 30 are connected to the outputs of the groups of receivers 21, 22, 23, 24 and the outputs are connected to the inputs of the group of drivers 29 so as selectively to connect one of the channels I/OD (i) to the channel MDAT 19 when the drivers 29 are enabled.

Each of the multiplexers 31, 32, 33, 34 is associated with one of the channels I/OD (i) and has four sets of inputs, each respectively connected to the outputs of the receivers 35, 21, 22, 23, 24, with the receiver of the associated channel I/OD (i) being excluded.

The outputs of the multiplexers 31, 32, 33, 34 are connected respectively to the inputs of the drivers 25, 26, 27, 28 so as selectively to connect the channel MDAT 19 to one of the channels I/OD and/or, possibly at the same time, to connect two I/OD channels together.

The operation of the multiplexers and the drivers is controlled by suitable commands SEL1 ... SELN generated by a decoder 36 which receivers suitable commands from the memory control unit 15 via the lines 20.

The commands are clocked by the signal CK.

It is immediately noted that, for example, it is possible simultaneously to connect, and without data collision, the channel I/OD1 as a source of data jointly to the channel MDAT 19 and to one of the other I/OD channels, or two I/OD channels together whilst a third I/OD channel is connected to the channel MDAT 19.

Figure 3:
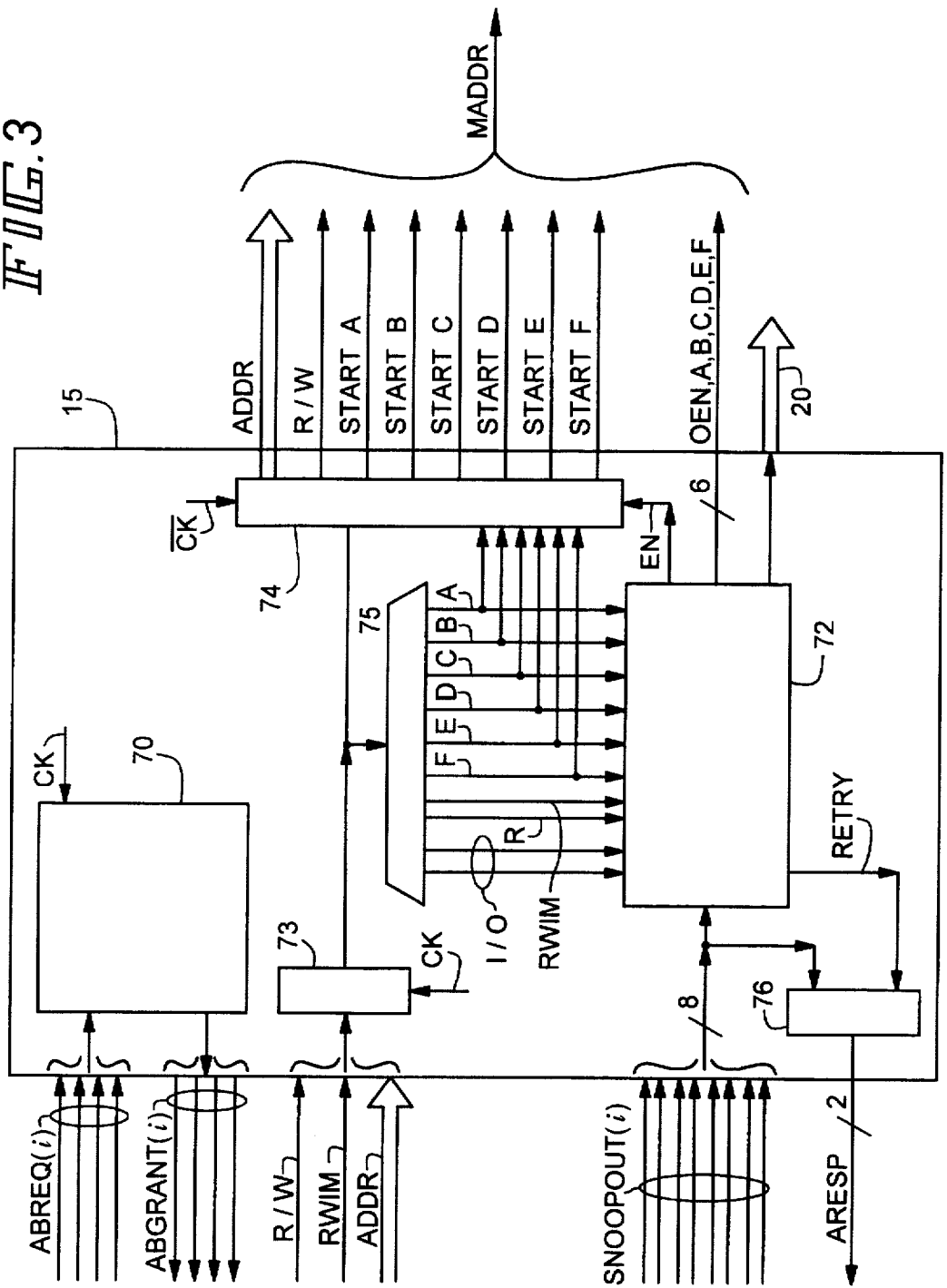
FIG. 3 is a block schematic diagram of an embodiment of a control unit for the system of FIG. 1.

FIG. 3 shows in block schematic form the structure of the system bus arbitration and memory control unit 15, which can be made as an integrated circuit.

The unit 15 comprises logic 70 for arbitrating access to the system bus (ABUS ARB UNIT), finite state logic 72 (STATE MACHINE), a pair of registers 73, 74, a decoder 75 and OR logic circuits 76.

The arbitration logic 70, of conventional type, receives at its input, via point-to-point connections between the various processors, bus access request signals ABREQ (i) and in an entirely conventional manner, with timing controlled by the signal CK, grants access to the system bus by sending a response signal ABGRANT (i) on one of a plurality of point-to-point connections with the various processors on a one at a time basis.

The logic 70 is preferably an integral part of the control unit 15, but can also be replaced by arbitration logic distributed throughout the processors in a known way, in which case the arbitration signals can be exchanged by means of multipoint connections.

The unit 15 receives command signals via the system bus ACBUS which define the operation to be performed, in particular a signal R/W which indicates if the requested operation is read or write and a signal RWIM which indicates a read operation with the intention of modifying the unit of data read. Other commands which can be present lie outside the scope of the invention and are not necessary for its understanding.

The commands are accompanied on the system bus by the memory address of where the operation is to be performed.

It is to be noted that the commands and the address are put on the system bus only after a processor has obtained access to the bus and jointly identify the resource (for example a memory module) which may be already engaged in the execution of other operations.

To avoid keeping the system bus occupied whilst waiting for the resource to become free, the unit 15, after having analysed the contents of the commands and the address, responds in this case with a signal RETRY: the command is thus refused and the requesting processor is invited to re-present it.

In this way the commands are executed only when the necessary resources are available. This ensures that the commands, if executed, are executed in a predetermined time which depends only on the execution speed of the resources involved. Therefore, in the case of reading from memory, the order in which the data are provided from memory is the same order as that in which the commands have been accepted.

The commands and address received from the unit 15 are held in the register 73, clocked by the signal CK and decoded by the decoder 75 (with inputs connected to the outputs of the register 73).

Essentially the decoder determines, on the basis of the address and the commands, which memory module (A, B, C, D, E or F) to use and if the requested operation is writing (R) or not. It can also identify, in dependence on the address, a transfer of data not destined for memory but for one of the processors which is identified with the signals I/O.

The output signals from the decoder are passed to the finite state logic 72 clocked by the signal CK and which at each period of the signal CK progresses as a function of the previously received signals.

Since, as already mentioned, as a consequence of the RETRY mechanism each operation requested by the processors, if executed, is executed in a predetermined time, the state logic is able on the basis of signals received in that time, to keep track of the resource state in the current clock period and in the subsequent periods.

The unit 72 therefore provides at its output a signal EN which enables loading Of the address and commands present in the register 73 into the output register 74 only if the necessary resources are available in the predetermined and necessary time interval.

The register 74 is loaded, as well as with the address and commands, with the signals A, B, C, D, E, F, only one of which is asserted at a time, and which when sent to the memory 5 on the channel MADDR18 selects and activates one of the memory modules (STARTA, STARTB, STARTC, STARTD, STARTE, STARTF) in a mutually exclusive manner.

In dependence on the memory operation activated, the unit 72 also transfers, via the channel 20, suitable timed commands for control of the data cross bar 16 (FIG. 1).

Finally, with the commands OENA,B,C,D,E,F the selected module is enabled to transfer, in the case of reading, the data read onto the channel MDAT19.

This only occurs if, during reading, an "intervention" condition does not occur following "snooping" as will now be considered.

In multi-processor systems with data replication in caches the consistency of the data is ensured essentially by two approaches:

1) immediate writing of each modified data unit in memory or "write through"

2) deferred writing of the modified data in memory only when the opportunity arises ("write back" or "copy back").

The first approach requires writing to memory each time a unit of data is modified in a processor cache and involves a significant use of the bus and memory resources for which reason it has fallen out of favour.

The second approach presupposes that all the processors observe the read requests sent to memory to check if the reading relates to a unit of data present in their cache in modified form, an updated copy of which does not exist in memory.

In this case the processor in the cache of which the modified data is present must signal this circumstance to the other processors and send the data to the processor requesting the requested data, replacing it in this at the memory the output of which is blocked, by not asserting the signal OENA, B, C, D.

Advantageously the unit 15 is arranged to operate with the second approach (but which is easily adaptable to the first approach), which simplifies the exchange of "snooping" signals between processors.

For this purpose the unit 15 receives from the various processors, via the point-to-point connections, SNOOP OUT (i) state signals sent from the various processors with suitable timing, to signal that a read request presented on the system bus ACBUS relates to data absent from cache (SNOOP OUT=NUL), present and valid in cache and therefore shared at least with the memory (SNOOP OUT= SHARED), or present in cache and modified with respect to that contained in memory (SNOOP OUT=MODIFY).

The SNOOP OUT (i) state signals can also indicate that it was not possible to perform the "SNOOPING" operation, for example because the processor was engaged, or else, in the case of data transferred between processors, because the transfer data cannot be received, and in both cases that the transaction cannot be completed and must be repeated (SNOOP OUT=RETRY).

These signals are received by the finite state logic 72 which takes account of them in defining the system state and the operations to be controlled.

As will be seen in more detail below, if the received signal is indicative of MODIFY, a processor must intervene to present the unit of data on its I/OD(i) channel after having had confirmation from the unit 15 that the "modify" operation must be performed.

The finite state logic 72 suitably controls, via the channel 20, the connections to be established between the various points of the data cross bar, giving maximum priority to the intervention request and, in the case of conflict for the use of the resources with a transaction already in progress, stopping this transaction and signalling, by assertion of the RETRY signal, that the operation must be repeated.

The SNOOP OUT (i) signals received from the various processors are then combined in an OR logic 76 which also receives the RETRY signal from the unit 72, asserted as necessary, and which produces ARESP output signals, transferred on the multipoint connections of the system bus to the various processors and indicative of the possible states of the system corresponding to NULL, SHARED, MODIFY or RETRY.

Figure 4:
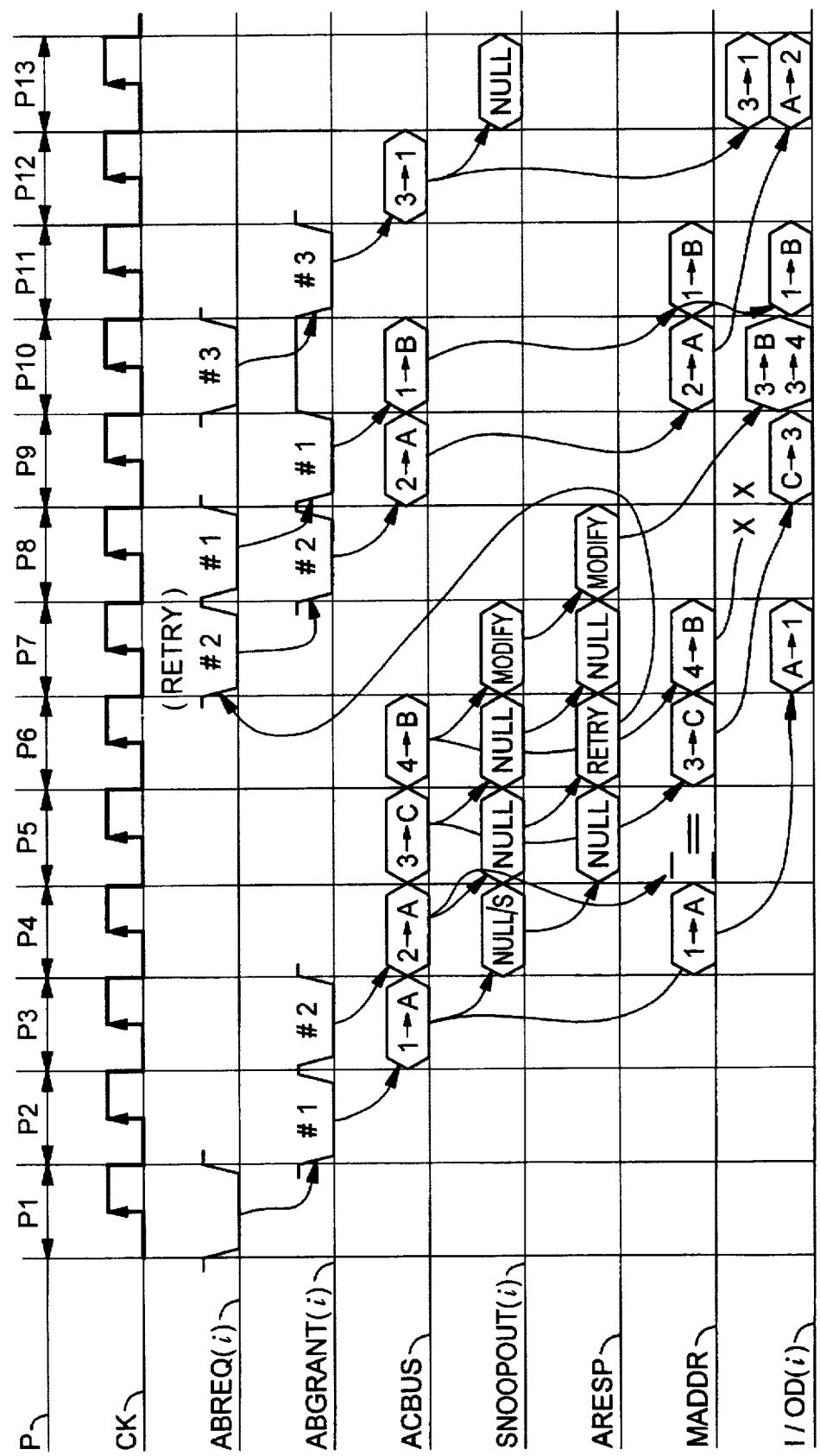
FIG. 4 is a timing diagram showing the operation of the multi-processor system of FIG. 1.

The timing diagram of FIG. 4 depicts in a concise form the operation of the system of FIG. 1 and the unit 16 of FIG. 2.

In particular the diagram CK depicts the state/level of the clock signal CK with time.

The diagram ABREQ (i) depicts the state of the access requests which the various processors can send to the unit 15.

The diagram is cumulative in the sense that it represents the electrical level of several communication lines, one per processor.

Similarly, the diagram ABGRANT (i) cumulatively depicts how the state of the response signals sent out by the unit 15 to the various processors vary with time.

The diagram ACBUS depicts variations in the state of the signals which define an address and associated command (read/write), transmitted from each of the processors in different time intervals, onto the system bus.

The diagram SNOOP OUT(i) depicts the cumulative variation with time in the state of the signals sent from the various processors to the unit 15 as a result of the continuous observation which they keep on the addresses present on the system bus ACBUS.

The diagram ARESP depicts the variation in time of the state of the signals emitted from unit 15 onto two lines of the system-bus in response to the reception of an address and the SNOOP OUT(i) signals.

With these signals the unit 15 informs all the processors that the associated transaction cannot be performed because the resources necessary for its execution are not available in the required time intervals and therefore the transaction must be requested again (RETRY), or else that the transaction relates to data not shared by several processors (NULL) or shared (SHARED) or modified by a processor (MODIFY).

The unit 15 grants access to the processors one at a time according to pre-established priority criteria (for example to the processor which last obtained access a longer time ago) and in dependence on the temporal availability of the resources necessary for the execution of the transaction.

The diagram MADDR represents the state of the address channel 18 which connects the unit 15 to the memory 5.

Finally, the diagram I/OD(i) represents the cumulative variation with time in the state of the various data channels and the unit DCB 16.

As can be appreciated, the clock signal CK defines a plurality of successive time intervals or clock periods P1, P2 ... P13 in which the clock signal, initially at level 0 or asserted (the relation between logic level and electrical level is entirely irrelevant) changes to level 1.

The various signals are asserted and de-asserted for times and durations not greater than the clock period and the transition of the clock signal from 0 to 1 at the centre of each period defines the instant in which the state of the signals is stable and can be "strobed" or recognised.

With these premises it is possible to examine how the various transactions possible between units of the system progress.

These transactions are essentially of four types:

1) access to memory 5 by a processor i to read an item of data; this transaction is activated by assertion of the signal ABREQ (i) by the processor followed by sending a read command together with the address.

2) access to memory 5 by a processor i for writing an item of data: this transaction is activated by assertion of the signal ABREQ (i) followed by sending a write command together with the address.

3) intervention by a processor (i) in the read transaction activated by another processor Y to provide the processor Y with an item of data in substitution for that read from memory.

This transaction is activated by signalling to the memory control unit 15 via the SNOOP OUT (i) lines that the item of data has been modified and is available in the processor i.

4) I/O message or direct interprocessor communication; with this transaction a processor I sends an item of data directly to a processor Y which for example fulfils a control function for peripheral apparatus.

The transaction differs from a write operation only because the address identifies a space outside the memory and is processor (or I/O) specific.

We now examine in detail the diagrams of FIG. 4 which, by way of example, show that in the time period P1 one (or more) ABREQ (i) signals are asserted.

The arbitration unit 15, having received the requests, grants access to the processor 1 by asserting the signal ABGRANT (1) in the time period P2. The access is granted on the basis of predetermined priority criteria, for example to the processor which obtained access to the bus longest ago.

Having received the signal ABGRANT (1) the processor 1 puts onto the ACBUS channel a memory address which identifies for example the module A (period P3).

The unit 15 receives this address and checks that the module A is free, that is to say, is not already engaged in a read/write operation, and activates it by putting the address received onto the channel MADDR 18 (period P4) by generating suitable module activation and selection signals.

Still by way of example, the module A addressed and activated during period P4, outputs during period P7 on MDAT channel 19, the information read.

In other words, by way of example, a read cycle requires four clock periods for its execution.

During period P7 the control unit 15 enables output from the module A and commands unit DCB 16 via lines 20 in such a way as to connect the channel 19 to the channel I/OD1 so as to transfer the data at the output from module A to the processor 1. With this, the read operation requested by processor 1 is concluded.

It is evident that during the periods from P4 to P7 other read or write operations of module A cannot be activated. Moreover, it is not possible to use the channel MADDR 18 during period P4 for addressing other modules, and likewise it is not possible use the channel MDAT 19 and the unit DCB 16 during period P7 to transfer other data between memory and another of the I/OD channels.

These occupied resource conditions are taken account of by the finite state logic of the control unit 15.

However, once the read operation has been started in module A the MADDR channel can be freed and therefore other operations relating to modules B or C, D, E or F can be activated before considering which is suitable to conclude the examination of the transaction started between processor 1 and module 7.

The address present on the system bus ACBUS during period P3 is received not only by the unit 15 but also by the processors 2, 3, 4 which are set up to check whether or not information identified by the same address is present in their cache and in which form (shared, modified).

If it is not present or it is only shared, the various processors send SNOOP OUT(i) signals with this signification (NULL/S) to the unit 15 during period P4.

During period P5 the unit 15 confirms, by sending to all the processors the signal ARESP with the signification NULL/S that no updating action to the state of the cache is requested at the various processors.

We now suppose that during period P3 processor 2 is granted access to the system bus for a read operation.

During period P4 the processor 2 puts an address on the system bus for a read operation in module (A) (2>A). This address is received by the unit 15 which has just activated a read cycle in module A.

Therefore unit 15, having checked that the resource constituted by module A is not available, does not transfer the address onto channel MADDR and having received confirmation from the processors 1, 3, 4 that the reading does not involve an item of data contained in their cache (SNOOP OUT(i)=NULL) signals to all the processors (ARESP=RETRY) that the reading will not be executed and that the processor 2 must repeat the read request (period P6).

Therefore during period P7 the processor P2 reasserts the signal ABREQ (2) and during period P8 the unit 15 asserts the signal ABGRANT2 (assuming that requests having a higher priority are not simultaneously made by other processors).

Thus during period P9 the processor 2 can again put the address onto the bus ACBUS and request a read operation in module A.

In this case since the necessary resources are free the operation takes place: the address is transferred from the control unit 15 onto channel MADDR 18 (period P10) and the item of data requested is received from the processor 2 via the channel MDAT 19, the unit DCB 16 and the channel I/O D2 during period P13.

We now suppose that the processor 3, having obtained access to the bus, during period P5 puts on the bus ACBUS an address directed at module C for a read operation.

Since module C is free the read operation can be started by unit 15 and takes place according to the temporal flow already seen and which it is not necessary to repeat. This is because, in the hypothesis, the data item read in module C is not present in any of the processor caches.

If, on the other hand, the data item is present in a cache and has been modified, the transaction progresses in a different manner: for example during period P6 the processor 4, which by hypothesis has obtained access to the bus ACBUS, puts on the bus an address for module B.

The control unit 15 transfers the address onto channel MADDR (period P7) and activates module B but also receives, with the SNOOP OUT(i) signals, an indication that the data item requested is present in the cache of another processor (for example the processor 3 SNOOP OUT 3=MODIFY).

Therefore the unit 15 signals to all the processors with ARESP=MODIFY (period P8) that the addressed data item will not be provided from memory but from a processor.

The processor 3 recognises that its request has been acknowledged. In the period P10 the unit 15 controls the unit DCB 16 in such a way as to allow the transfer of the modified data item from the processor 3 to the processor 4 via the channel I/O D3, the unit DCB 16 and the channel I/O D4, whilst the data item read in module B is not transferred from the output of the module due to the effect of the omit assertion signal OEN B.

Advantageously the output data from the processor 3 is also transferred to module B for writing into the module in substitution for the pre-existing data item.

The last type of transaction to be considered is that of writing.

For example the processor 1 asserts a request ABREQ (i) for access to the system bus in the period P8 and, there not being any other request for access having greater priority, obtains access to the bus ACBUS (period P9, ABGRANT1 signal asserted).

During period P10 it therefore puts an address (1>B) for module B and a write command on the channel ACBUS.

On the hypothesis that the unit 15 does not identify a resource conflict, during the subsequent period P11 the address is transferred to channel MADDR 18 and the data item to be written is transferred from channel I/O D1 to channel MDAT 19.

If the resource is not available, or because the memory module is engaged, or because during period P11 the channel MDAT 19 will be engaged (following a MODIFY signal), transfer of the data item and address will be blocked and during the period P11 the unit 15 will assert a RETRY signal.

It is worth noting that a write request presented jointly with a modify request (MODIFY) asserted by another processor, can be treated in two different ways.

If when each modify is asserted it is arranged that the corresponding data item is updated in memory before writing, the write request collides with the modify request, which has greater priority, and is not allowed access to the system bus.

If on the other hand the read operation which has just caused the intervention of another processor with a MODIFY signal, is a read operation with intent to modify RWIT (that is to say, it is already known that the read data item will be modified), updating of the data item in the memory is useless and it is possible to grant access to the system bus for a write operation even if a request for access to one of the data channels is simultaneously present for a transfer operation of a data item from one processor to another.

That is to say a temporal superimposition of two data transfers is achieved without conflict, which in a conventional system bus architecture would not be possible.

This superimposition is also possible between interprocessor data exchange operations and memory read operations by resolving possible access collisions with the RETRY signal.

In this hypothesis, if for example during period P10 the processor 3 asserts a data write access request (ABREQ3 asserted) and during period P11 the unit 15 grants access to the system bus (ABGRANT3 asserted) the processor 3 puts on the bus ACBUS an address which identifies the operation as I/O intended for processor 1 (period P12).

The unit 15, having verified that the I/O operation is intended for processor 1, and that there are no resource conflicts, commands unit DCB 16 in such a way as to transfer the data item from channel I/O D3 to channel I/O D1 at the same time that the unit DCB is commanded to transfer a data item read in memory from channel MDAT 19 to channel I/O D2.

The preceding description refers to an architecture such as that in FIG. 1 in which the data cross bar 16 does not have any holding element.

The transfer of a data item via the unit 16 therefore takes place in a single time period.

For this reason it is therefore arranged that the data to be output from any of the processors is transferred in a time period subsequent to that in which the address is presented to the system bus: this gives the unit 15 time to check if the necessary resources for the requested operation are available.

The transfer of data through the unit 16 in a single time period presupposes that the data propagates through the whole length of the channel I/OD(i), through the unit 16 and through the channel MDAT 19 within this time period.

The clock period is therefore given a lower limit by this condition.

According to a further aspect of the present invention the cross bar interconnection logic is provided with input holding registers each disposed immediately downstream of the receivers 21, 22, 23, 24 and 35 and output holding registers disposed immediately upstream of the output drivers 25, 26, 27, 28 and 29.

With the adoption of only input holding registers the data path is divided into two branches each of which can be traversed in two successive clock periods, each of very much shorter duration even if overall of duration equivalent to that considered with reference to FIG. 3.

With the adoption of input and output holding registers the path of data is divided into three branches each traversed in one of three successive clock periods.

In both cases a very high transfer frequency on the channel MDAT 19 is obtained and the partial superimposition of the data transfer phases from different channels is also obtained.

This subdivision of the data path further allows the adoption of different transfer parallelism between memory and DCB and between DCB and processors which makes it possible to reduce significantly the number of terminals of individual processors.

Figure 5:
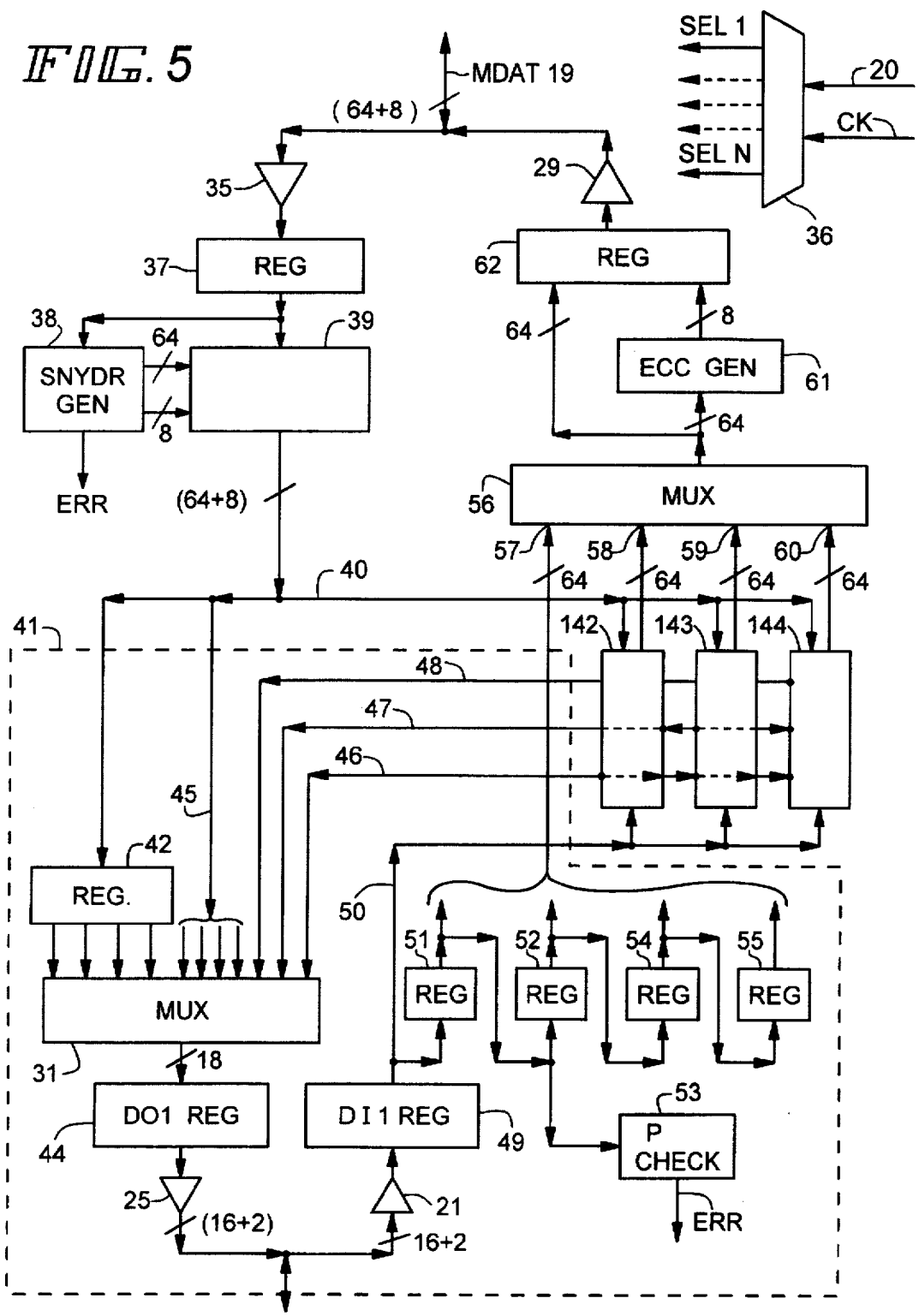
FIG. 5 is a block schematic diagram of a preferred embodiment of a data cross bar for the system of FIG. 1.

FIG. 5 schematically represents in block diagram form a preferred embodiment of the data cross bar which employs these and other innovative concepts.

In FIG. 5 the functional elements corresponding to the elements already shown in the diagram of FIG. 2 have been indicated with the same reference numerals.

The data channel MDAT 19 constituted by 64+8 lines allows transfer of data to and from memory with 8 byte parallelism (a double word) accompanied by an 8 byte error correction code.

The data channel 19 is connected to the receivers 35 and to the drivers 29.

The output of the receivers 35 is connected to a holding register 37 for holding data received from memory.

The output of the registers 37 are connected to syndrome generation logic 38 (SYNDR GEN) and to an error correction network 39 (DATA CORRECTION) of conventional type.

The syndrome generator 38 analyses information received, recognises possible correctable and non-correctable errors (in which latter case it provides an "error not correctable" output signal) and controls the logic 39 for correction of correctable errors.

It also associates with each byte of information a parity control byte which it transfers to the logic 39.

The logic 39 presents 8 byte information, each accompanied by a parity byte, on an output channel 40.

The output channel 40 distributes information to four groups of logic circuits 41, 142, 143, 144, each dedicated to a processor channel.

Since the groups 41, 142, 143, 144 are identical to one another only the group 41 dedicated to the channel I/O D1 has been shown in detail.

The group 41 comprises a first 72 byte register 42 the inputs of which are connected to the channel 40 and the outputs of which are connected, in groups of 18 elements, to form input groups of a multiplexer 31 having 11 groups of inputs, each of 18 elements.

The outputs of the multiplexer 31 are connected to the inputs of an 18 cell register 44 the outputs of which are connected to the inputs of the drivers 25 the outputs of which lead to the channel I/O D1.

Four groups of inputs 45 of the multiplexer 31 are connected directly to the channel 40.

The remaining three groups of inputs are connected respectively to three channels 46, 47, 48 each of 18 wires, on to which the logic groups 142, 143, 144 respectively feed two bytes of information, each accompanied by a parity byte.

The multiplexer 31, controlled by suitable selection signals generated by the decoder 20, allows the register 44 to be loaded in succession, and therefore to transfer in succession to the channel I/O D1, pairs of bytes extracted from the double word present on the channel 40 or held in the register 43. It also allows pairs of bytes (and associated parity bytes) coming individually or in succession from the channels I/O D2, D3, D4 via the logic groups 142, 143, 144 respectively to be transferred onto channel I/O D1.

The possibility offered by the multiplexer of directly selecting a double byte from the channel 40 makes it possible simultaneously to load the register 44 with a double byte present on the channel 40 and to load the register 42 with the double word present on the channel 40.

In this way transfer to the processor of the double byte expressly addressed by a read operation can be made very fast. The remaining double bytes held in the register 42 can be made to follow this double byte in a suitable order.

The reading flow will, however, be considered more below.

For writing data in memory or for transfer of data between processors, the data cross bar includes, in unit 41, a receiver group 21 with inlets connected to the channel I/O D1, and outputs connected to 18 cell register 49.

The outputs of the register 49 are connected to a channel 50 which distributes the information held in the register 49 to the logic groups 42, 43, 44 (in particular to multiplexers equivalent the multiplexer 31).

The outputs of the register 49 are also connected to the inputs of a second register 51 the outputs of which are connected to the inputs of a third register 52 and parity error check logic (PCHECK).

The outputs of the register 52 are in turn connected to the inputs of a fourth register 54 the outputs of which are connected to the inputs of a fifth register 55 in cascade.

Whilst the registers 49 and 51 have 18 cells, the registers 52, 54, 55 have 16 cells, it being superfluous to hold the parity bits.

The byte outputs of the registers 51, 52, 54, 55 are connected to a first group of inputs 57 of a multiplexer 56 having four channels each of 64 bits.

The other groups of inputs 58, 59, 60 are respectively connected to logic groups 142, 143, 144 corresponding to the group 41 and associated with data channels I/OD2, I/OD3, I/OD4.

The outputs of the multiplexer 56 are connected to the inputs of an 8 bit code generation logic 61 for detection and correction of errors (ECC GEN) and to the inputs of a 72 bit register 62 which also receives on 8 inputs the ECC code generated by the logic 61.

The outputs of the register 62 are connected to the inputs of the output drivers 29 leading to the memory channel MDAT 19.

Figure 6:
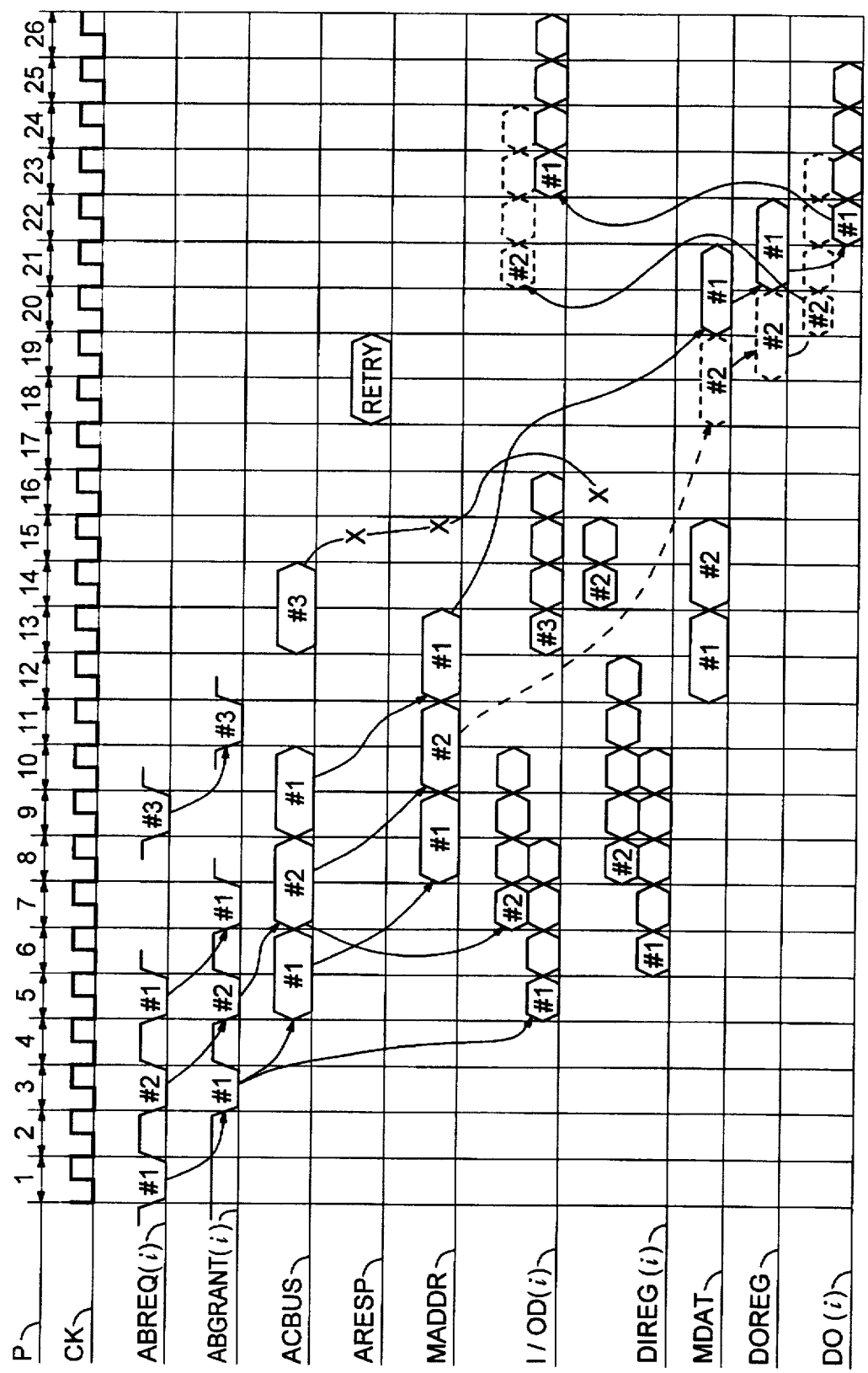
FIG. 6 is a timing diagram showing the operation of the multi-processor system with a data cross bar of the type shown in FIG. 5.

FIG. 6 is a timing diagram showing the behaviour of the DCB logic of FIG. 5.

The various lines of the diagram identified by the same signal names have the significance already seen with reference to FIG. 4.

For simplicity the SNOOP OUT diagram is omitted whilst to the I/OD(i) diagram which represents the state of the connection channels to the processors is added the diagram DIREG which represents the state of the DCB input registers such as the register 49 and 37 of FIG. 5, the diagram MDAT which represents the state of the memory data channel MDAT 19, the diagram DOREG which represents the state of the input register 37 to the DCB from memory, and the diagram DO(i) which represents the state of the DCB output registers 44 to the data channels.

With the division into branches of the data path it is possible to use very short clock periods CK, for example of 10 nsec and to occupy the bus ACBUS or the memory channel MDAT for only two periods (20 nsec at each transfer).

At each transfer it is possible to transfer 8 bytes of data (two words) or multiples thereof.

At the data channel level of the processor the transfer can take place with a succession of partial transfers of two bytes at a time each executed during a clock period by exploiting the fact that in the architecture described each channel has available dedicated and "buffered" resources.

This carries the possibility of superimposing the times of data transfer between several different channel I/Os and memory.

At the same time the memory data channel MDAT and the address bus of the system constitute two nodes which impose sequential and ordered flow of data and addresses and allow the management and control of the various operations without the necessity of associating correlation labels to the said data and addresses which become entirely superfluous.

Considering FIG. 6, a generic processor 1 asserts, in period P1, a request for access ABREQ1, receiving during period P3 grant of access to the system bus and to the data channel.

During periods P5 and P6 the processor 1 therefore puts an address and associated commands on bus ACBUS.

The address is transferred from the memory control unit 15 onto the memory address channel MADDR during periods P8 and P9.

In the meantime the processor 1 has put a double byte of data on the channel I/O D1 during period P5, which is held in register 49 (FIG. 4) during the period P6, and transferred during the subsequent periods gradually from the register 49 to the register 51, 52, 54, 55.

During period P10 the first double byte received through the channel I/O D1 is held in the register 55.

During period P6 the processor 1 puts a second double byte of data on the channel I/O D1, which having been transferred from register 49 and into the cascaded registers 51, 52, 54 is held in register 54 starting from period P10.

In the same way the processor 1 puts a third and a fourth pair of bytes onto the channel I/O D1 during periods P7 and P8, which are held and available respectively in registers 51 and 52 starting from period P10.

Thus the processor 1 effects transfer of 8 bytes of successive pairs in the course of the four periods P5, P8 and starting from period P10 the 8 bytes are available in parallel at the output of the multiplexer 56.

During periods P12, P13, the multiplexer 56 is enabled and the information transferred to the register 62 where it is held, maintaining the output data on the channel MDAT 19.

If another processor 2 asserts the signal ABREQ2 during period P3 and receives access ABGRANT2 during period P5 for a write operation in a different module from that already engaged by the processor 1 and the necessary resources are free, the processor 2 can start and complete the write operation by putting an address on the bus ACBUS during periods P7, P8 and by putting in succession four pairs of bytes onto the channel I/O D2 during periods P7 ... P10.

This information is copied and maintained in the register 62 during periods P14, P15.

The transfer from the two processors 1 and 2 to memory therefore takes place in partial temporal superimposition.

A read operation proceeds with a substantially similar flow.

For example an access request presented during period P5 from the processor 1 obtains grant of access during period P7 such that the bus ACBUS can be occupied with an address during periods P9, P10.

The address is transferred onto channel MADDR 18 during periods P12, P13.

The data item read is available on channel MDAT 19 for example during periods P20, P21 and is held in register 37 (diagram DOREG) during periods P21, P22.

In period P22 the multiplexer 31 and the register 42 can be controlled so as to transfer a pair of bytes to the register 44 and to load all the 8 bytes received from memory into the register 42.

In period P22 the channel MDAT 19 and the register B7 are therefore free to transfer and hold other information destined for example for another processor.

In the period P23 the double byte held in the register 44 can be transferred onto channel I/O D1 whilst the register 44 is loaded with a double byte selected by the multiplexer 31 from among those held on the register 42.

During periods 24, 25, 26 the subsequent three pairs of bytes are transferred onto channel I/O D1 and the transfer is completed.

It is evident that reading too can take place with the transfer operations partially superimposed with other reading operations.

For example during period P3 if an access request by processor 2 were asserted, associated with a read operation rather than a write operation, during periods P7, P8, still on the hypothesis that resources are available, the data item read would be present on the channel MDAT during periods P18, P19 and would be loaded into the register 37 (diagram DOREG) during periods P19, P20.

The block transfer into the register 44 (diagram DO(I)) would take place during periods P20 . . . P23 and transfer onto the channel I/O D2 during periods P21 . . . P24 in partial temporal superimposition with the operations in progress in the registers D01 and on channel I/O D1.

We now suppose that during period P9 a processor 3 requests access to the system bus for a write operation.

This presupposes the availability of the channel MDAT after 10 clock periods from the period when the request is asserted, that is to say during periods P20, P21 when, on the other hand the channel MDAT will be engaged to satisfy the read request represented during period P5.

Therefore the memory control unit 15 once having granted access to the bus, and having recognised the operation as a write operation (periods P13, P14), blocks the transaction by preventing the transfer of the address onto the MADDR channel (period P16) and the transfer of the data onto the channel MDAT and forces the processor 3, with a RETRY signal, presented at a predetermined time, as an ARESP signal (periods P18, P19) to repeat the access request during period P21 or thereafter.

It can therefore be seen that whilst the execution of a data transfer operation requires 9 clock periods to write in memory and 18 clock periods to read from memory, the interference time and possible collision time between two transfer operations is limited to only two clock periods.

Partially superimposed transfers are therefore possible, which take place with the use of different memory resources (modules), different processor channels (I/O (i)) and dedicated buffering, serialisation and parallelisation resources dedicated to each processor channel in the DCB logic.

It is also an immediate conclusion, on the basis of the diagram of FIG. 5 and on the diagrams of FIG. 6, that in the event of intervention of a processor to transfer a modified item of data to another processor the transfer operation can take place directly in serial form of pairs of bytes, from one register functionally equivalent to the register 49 of FIG. 4, to a register functionally equivalent to the register 44, via one of the channels 50, 46, 47, 48.

This transfer, as already seen with reference to the timing diagrams of FIG. 3, can be integrally temporally superimposed over one or more transfers between processors and memory.

It is clear that the preceding description relates only to a preferred embodiment of the invention and that many variations can be introduced.

The number of processors and memory modules (4 processors and 6 modules in the preferred embodiment) can be chosen at will as can the parallelism ratio between memory parallelism and processor parallelism.

More data cross bar logic components can be utilised in parallel to achieve multiple parallelism and the DCB logics can be provided, in addition to parity check circuits, with error correction and code generation for detection and correction of errors as well as circuits for alignment of individual bytes of information, as well as circuits for combining (merging) information read from memory with information coming from processors for the partial modification of memory information.

It is also possible to use separate signals for arbitration of access to the address and command buses (ABREQ(i)) and for access to the data channel (DBREQ(i)), characterising the transaction up to the presentation of the request for access as read/write or other type and to condition the grant of the bus on the availability of the necessary resources present or planned, thereby reducing to the minimum the cases of "RETRY" and therefore with an optimum exploitation of the system bus.

To allow the same processor to receive data in rapid succession following consecutive read requests, the register 42 can be constituted by a plurality of registers in cascade or a "stack" of the "FIFO" type (first in-first out).

The same concept can be used to avoid RETRY operations in the case of write operations with resource conflict, by storing the write operation in an input buffer disposed downstream of the registers 51, 52, 54, 55 of FIG. 5 and by arranging a similar buffer register for temporary deposit of the address in the control unit 15.

In this way a write operation which cannot be performed in a predetermined period can be deferred to a subsequent period in which the necessary resources are available.

Moreover, it is not indispensable that all or part of the processors are provided with caches in that the advantages offered by the architecture forming the subject of the present invention are achieved by the fact that transfer of data between processors can be carried out in superimposition with transfers between processors and memory.

Finally it must be clear that in the preceding description the term "processor" can be taken to include also a group or "cluster" of processors. These can be interconnected together with a local bus and communicate with the system bus and with the point-to-point channels for the transfer of data through an interface adaptor so that the external effects of the group of processors is seen as a single processor.

Direct connection without interface adaptor, of groups of processors directly to the system bus is also possible, each processor of the group being directly connected to the same data transfer channel, which can be considered as a multipoint data bus relative to the connections with several processors and a point-to-point data bus in relation to the aggregate of processors and to its connection to the data cross bus 16.

Naturally, in this case the "transfer rate" of data would be less due to the greater loads on the data channel, and it would be necessary to adopt a lower clock signal frequency CK.

Alternatively, in the case of a system in which a first plurality of individual processors communicates with the data cross bar through a plurality of point-to-point data channels and a second plurality of processors (for example processors functioning as peripheral controllers which have lower speed requirements) communicate with the data cross bar through a single multipoint (data channel) bus, the data transfer on this bus could take place with the occupation of the bus for several clock periods (for example 2) maintaining unchanged the transfer frequency (a single clock period for each block transferred).

This solution is evidently convenient only if the data cross bar is of the type shown in FIG. 5 that is to say provided with buffer registers.

Figure 7:
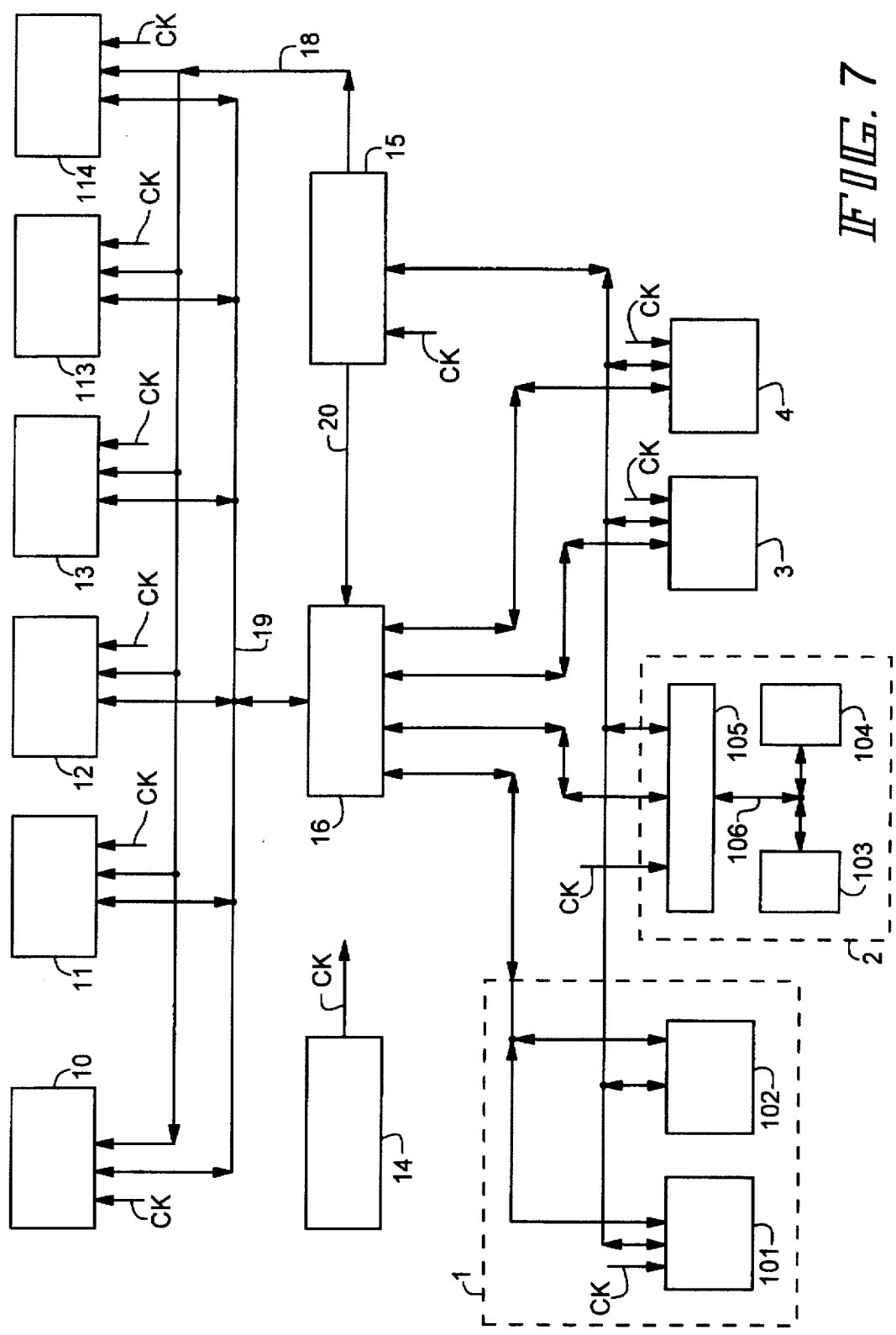
FIG. 7 is a block schematic diagram of a variant embodiment of the multi-processor system of FIG. 1.

FIG. 7, like FIG. 1, schematically illustrates this type of architecture. The different elements which are functionally equivalent to those of FIG. 1 are identified with the same reference numerals.

The diagram of FIG. 7 differs from that of FIG. 1 only by the fact that the processors 1 and 2 are constituted by a pair of processors.

The processor 1 is constituted by two processors 101, 102 directly connected to the ACBUS bus 17 and to the data channel I/O D1.

These two processes are seen from the memory control and arbitration unit 15 as two separate processors in competition with one another not only for access to the command and address bus, but also for access to the data channel I/OD1.

The unit 15 can take account of this fact both in the arbitration unit and in its finite state logic, and it is evident that the two processors 101 and 102 cannot conduct transactions on data channel I/O D1 in temporal superimposition.

The processor 2 is constituted by two processors 103, 104 and by an interface adaptor 105.

The two processors 103, 104 communicate with one another and with interface logic through a local bus 106 of conventional type.

The interface logic 105 is connected to the command and address bus 17 and to the data channel I/O D2 and arbitrates access to the local bus 106 by recognising the access requests presented by the processors 103, 104 for the system bus 17 and the data channel I/OD2.

These requests are transferred to the system bus in accordance with the protocol and timing of this bus.

It is evident that, whilst the local bus 106 can be of asynchronous type and the operation of the processors 103 and 104 can be of asynchronous type, the unit 105 must be timed by the CK signal so as to operate in synchronism with the other elements of the system. The processors 101, 102 which communicate directly with the system bus 17 and with the channel I/O D2 must be subject to the same condition.

The two processors 103, 104 are seen by the unit 15 as a single processor and the unit 105 performs the function of diverting the message data received to one or the other of the processors.

We claim:

1. A multi-processor system wherein a plurality of groups of processors each group comprising at least one processor, has access to a plurality of shared memory modules, the operation of said groups of processors and said memory modules being timed by a common synchronization signal, comprising:

a memory control unit timed by said synchronization signal, a multi-point system bus connected to said groups of processors and to said memory control unit which transfers memory addresses and read/write operation commands to said memory control unit, interconnection logic circuits, a plurality of point-to-point connection channels one for each of said groups of processors, which transfer data between each of said groups of processors and said shared memory modules and between said groups of processors, each of said connection channels individually connecting one of said groups of processors to said interconnection logic circuits, a memory address channel connected to said memory control unit and to said shared memory modules for addressing of said shared memory modules by said control unit, a memory data transfer channel for input/output transfers from said shared memory modules, for coupling said shared memory modules to said interconnection logic circuits, said interconnection logic circuits being controlled by said memory control unit for selectively connecting said point-to-point connection channels to said memory data transfer channel and between themselves, and control logic circuits in said memory control unit which receive via said system bus memory addresses and associated read/write operation commands placed one at a time by said processor groups on said system bus, and operative to identify resources requested for execution of said read/write operation commands and their availability in time, to transfer said memory addresses and associated read/write operation commands onto said address channel, together with signals for selection of a shared memory module if said resources are available, and to command and time the selective interconnection of said point-to-point connection channels between themselves and with said memory data transfer channel in said interconnection logic circuits.

2. A system as in claim 1, wherein said interconnection logic circuits comprise an input data holding register for each channel coupled to said logic circuits.

3. A system as in claim 2, wherein said interconnection logic circuits include a holding register for data output from said interconnection logic circuits for each of said channels coupled to said logic circuits.

4. A system as in claim 3, wherein:

said memory data transfer channel has a parallelism which is a multiple of the parallelism of said point-to-point connection channels, and said interconnection logic circuits comprise, for each point-to-point channel (I/ODi) coupled to said interconnection logic circuits a plurality of registers in cascade for accumulation of a plurality of data received at subsequent times, and means for simultaneous transfer of said plurality of data to an output data holding register for data output to said memory data transfer channel.

5. A system as in claim 4, wherein said interconnection logic circuits include a plurality of multiplexers each coupled between a data input register of said memory data transfer channel and a respective output data holding register for holding data output to one of said point-to-point channels for transfer at subsequent times of portions of said data held in said input register to said holding register for holding data output to an associated point-to-point channel.

6. A system as in claim 5, wherein said multiplexers have a plurality of groups of inputs each coupled to the outputs of one of said holding registers for data input from one of said point-to-point channels.

7. A system as in claim 1, wherein said control logic circuits include a system bus access arbitration unit for arbitrating access of said processor groups to said system bus.

8. A system as in claim 7, wherein said control logic circuits include means for receiving from said groups of processors intervention request signals for modification of an item of data read in one of said shared memory modules on request of a first of said groups of processors, and for controlling said interconnection logic circuits to transfer a modified data unit, provided from a second of said groups of processors to said first group of processors.

9. A multi-processor system wherein each of a plurality of groups of processors, each group comprising at least one processor, has access to a shared memory comprising a plurality of memory modules, individually controlled to perform read/write operations with partial overlap of operating time, comprising:

- a memory control unit, common to said memory modules for addressing and controlling the operation of said memory modules,
- a memory address channel connecting said memory control unit to said memory modules,
- a multi-point system bus connected to said groups of processors and to said memory control unit to transfer memory addresses and associated read/write operation commands, placed one at a time by said groups of processors onto said multi-point system bus, to said memory control unit,
- data cross bar interconnection logic circuits,
- a plurality of point-to-point connection channels one for each of said groups of processors, individually connecting one of said groups of processors to said data cross bar interconnection logic circuits, for transferring data between each of said groups of processors and said memory modules,
- a memory data transfer channel coupling said memory modules to said data cross bar interconnection logic circuits, said data cross bar interconnection logic circuits being controlled by said memory control unit for selectively connecting said point-to-point connection channels to said memory data transfer channel, and
- control logic circuits in said memory control unit for receiving via said system bus said memory addresses and associated read/write operation commands, one at a time and operative to identify resources requested for the execution of said read/write operation commands and their availability in time, to transfer said memory addresses and associated read/write operation commands onto said address channel, together with signals for selection of a memory module if said resources are available, and to command and time the selective interconnection of said point-to-point connection channels with said memory data transfer channel in said data cross bar interconnection logic circuits.

10. A system as in claim 9, wherein said plurality of groups of processors, said memory and said data cross bar interconnection logic circuits are timed by a periodic synchronization signal having period lesser than a data propagation time through a data path formed by said memory data transfer channel, said data cross bar interconnection logic circuits and one of said point-to-point connection channels, said data cross bar interconnection logic circuits comprising an input data holding register for each one of said point-to-point connection channels coupled to said data cross bar interconnection logic circuits and for said memory data transfer channel, said input data holding registers being timed by said periodic synchronization signal, whereby said data path is traversed in two successive periods of said synchronization signal.

11. A system as in claim 10, wherein said data cross bar interconnection logic circuits include an output data holding register for data output from said data cross bar interconnection logic circuits for each of said channels coupled to said logic circuits, said output data holding registers being timed by said periodic synchronization signal, whereby said data path is traversed in three successive periods of said synchronization signal.

* * * * *